United States Patent [19]

Kalb et al.

[11] 3,912,915
[45] Oct. 14, 1975

[54] DOPPLER DATA PROCESSOR WITH DIGITAL COMPUTING PULSE RATE FILTER

[75] Inventors: Henry T. Kalb, Manchester; Frank L. Crosswy; Jim A. McClure, both of Tullahoma; Edward B. Harding, McMinnville; Billy J. McClure, Tullahoma; Donnie J. Inglish, Hillsboro, all of Tenn.

[73] Assignee: The United States of America as represented by the Secretary of the Air Force, Washington, D.C.

[22] Filed: May 1, 1973

[21] Appl. No.: 356,269

[52] U.S. Cl. .................. 235/152; 343/5 DP; 343/8
[51] Int. Cl.² ........................................ G01P 3/36
[58] Field of Search .......... 235/156, 152; 343/5 DP, 343/8; 328/167

[56] References Cited
UNITED STATES PATENTS

| 3,351,943 | 11/1967 | Bush et al. ...................... 235/152 X |
| 3,689,921 | 9/1972 | Berry ............................ 343/5 DP X |
| 3,714,402 | 1/1973 | Baumwolspiner .................. 235/152 |
| 3,732,409 | 5/1973 | Fletcher ........................ 235/152 X |
| 3,740,537 | 6/1973 | Giles et al. ........................ 235/152 |
| 3,757,261 | 9/1973 | Sather .............................. 235/152 |
| 3,763,362 | 10/1972 | Griem ............................ 235/152 X |
| 3,797,016 | 3/1974 | Martin .......................... 343/5 DP X |
| 3,797,017 | 3/1974 | Taylor, Jr. ..................... 343/5 DP X |

Primary Examiner—David H. Malzahn
Attorney, Agent, or Firm—Joseph E. Rusz; William Stepanishen

[57] ABSTRACT

A doppler data processor apparatus utilizing a digital computing pulse rate filter for processing frequency burst type data produced by a laser doppler velocimeter.

2 Claims, 5 Drawing Figures

DOPPLER DATA PROCESSOR WITH DIGITAL COMPUTING PULSE RATE FILTER

BACKGROUND OF THE INVENTION

The present invention relates broadly to a doppler data processor apparatus and in particular to a digital computing pulse rate filter for processing the doppler data.

In the prior art, laser system have been utilized to provide doppler shift frequency information. However, the data processing of the Doppler information to obtain the frequency shift data has been rather slow and cumbersome. The prior art methods for maximizing valid data acquisition have had a low confidence factor. An improvement over the prior art methods of data retrieval from a doppler system was described in a copending patent application entitled, "Doppler Shift Laser Velocimeter Data Processor", Ser. No. 96,817, filed Dec. 10, 1970 by Kalb et al issued June 12, 1973 as U.S. Pat. No. 3,738,750. An apparatus was described therein for processing a burst type of laser doppler velocimeter signal which is commonly encountered in low scatter center density flow media. The doppler data processor utilized a pulse stretcher type pulse rate filter to separate the data from the noise which is present in the signal. The present invention differs from the pulse stretcher apparatus by utilizing a new filter technique.

SUMMARY OF THE INVENTION

The present invention utilizes a digital error detecting pulse rate computer filter circuit in a laser velocimeter data processor for selectively processing frequency burst type data from a laser doppler velocimeter. The digital pulse rate computing filter provides a precisely known (and controlled) time interval window for data selection or rejection decision making and freedom from linearity errors (and calibration requirements) associated with the analog pulse stretcher filter. The time interval of the data window can be reduced to a smaller percentage of the total sample time than practical by analog stretcher techniques. Velocity data are available for transfer to an acquisition system in both parallel BCD and natural binary form. BCD counters employ 10 out of 16 logic states whereas natural binary counters use all 16 states; thus, an equivalent magnitude of data may be transferred or stored more efficiently in binary form.

It is one object of the invention, therefore, to provide an improved Doppler data processor apparatus to determine the period of the Doppler frequency which is contained in the burst type signal.

It is another object of the invention to provide an improved Doppler data processor apparatus to determine the Doppler frequency period in a minimum sample time interval.

It is another object of the invention to provide an improved Doppler data processor apparatus to differentiate between a valid frequency burst and randon noise sources or bursts too short to make an accurate period determination.

It is still another object of the invention to provide an improved Doppler data processor apparatus to permit a real time visual observation of the signal quality being sampled and a means of confirming the accuracy of the processor date output.

It is yet another object of the invention to provide an improved Doppler data processor apparatus to permit the reliable tracking of a widely and rapidly varying flow media and to provide velocity data without the use of artificial seeding of the flow media.

These and other advantages, objects and features of the invention will become more apparent from the following description taken in connection with the illustrative embodiment in the accompanying drawings.

DESCRIPTION OF THE PREFERRED EMBODIMENT

Figure 1:
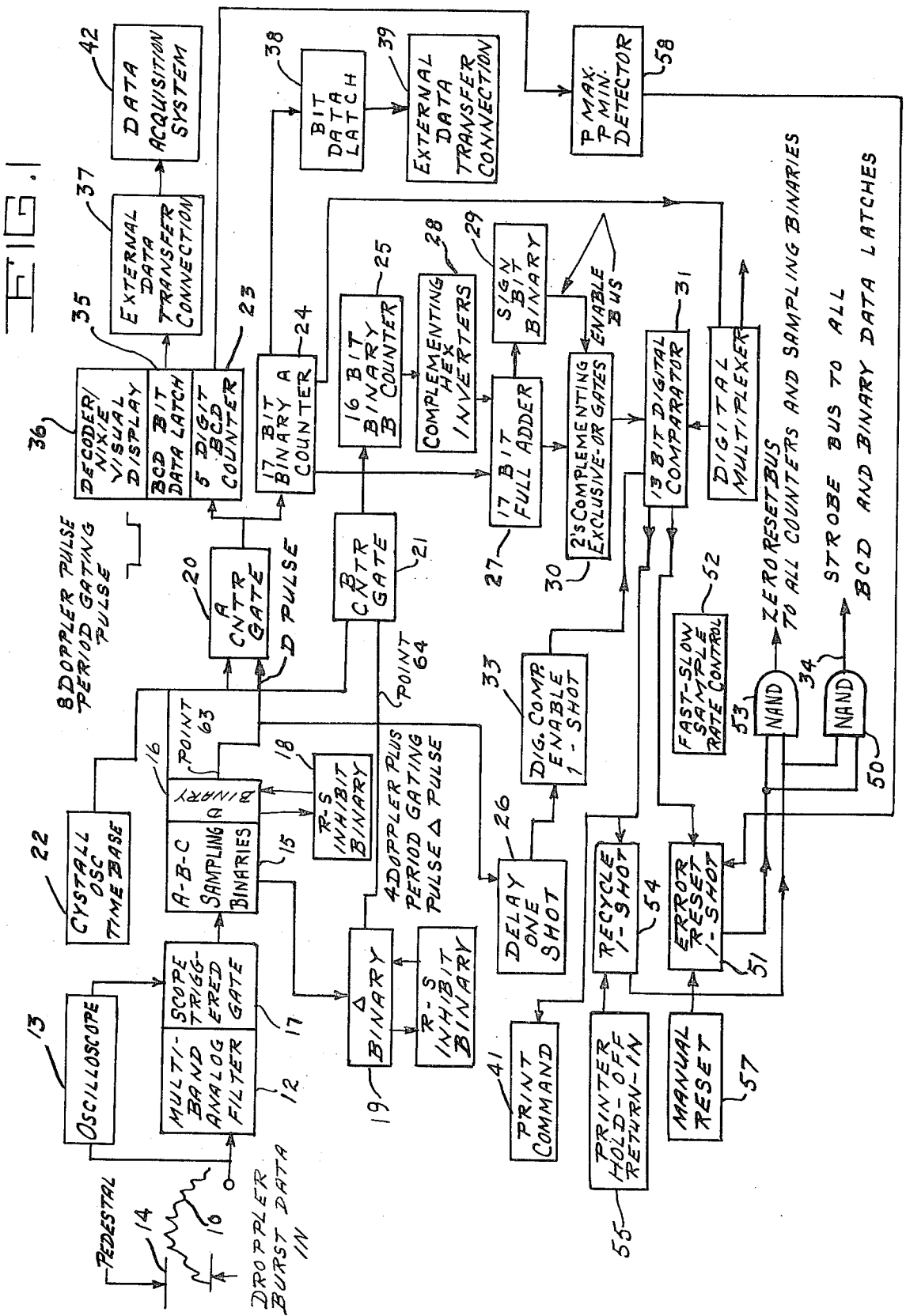
FIG. 1 is a block diagram of the Doppler data processor apparatus with the digital error detecting pulse rate filter circuit.

Referring now to FIG. 1, there is shown the Doppler data processor having a digital error detecting pulse rate filter circuit. The circuit is usable for capture of Doppler burst data over the frequency range of 1 KHz to 500 KHz. A method for extended coverage to frequencies above 500 KHz will be discussed later.

The burst data 10 is shown entering the multi-band analog filter 12 with a simultaneous display on the oscilloscope 13. The multi-band analog filter 12 is comprised of a plurality of band pass filters which are shown and described on page 665 of "Electrical Engineering Circuits", by Skilling and published by Wiley and Sons Inc. The filter 12 removes the pedestal 14 and attenuates noise outside the filter pass band applicable to the signal frequency of interest. Six bands are used covering 2½ octaves per band. A scope triggered gate 17 is used to prevent the A thru D binaries 15, 16 from sampling prior to the incident of a Doppler burst (displayed on the scope). The burst data occur randomly, when a scatter center passes through the laser doppler velocimeter probe volume. The sampling binaries 15 must be pre-set and ready to sample when the burst event occurs. The oscilloscope 13 then permits the sampling binaries 15 to see the burst signal by opening gate 17. The A thru D binaries 15, 16 will accept the first eight pulses of Doppler frequency data after the gate 17 opens. The D Binary 16 outputs a pulse of time duration equivalent to 8 time periods of input Doppler pulse data. The D binary 16 is inhibited from processing pulse data beyond the 8th pulse by the R-S Binary 18. The Δ Binary 19 functions in a similar manner receiving the first four pulses of the eight pulse train and outputs a pulse of time duration equal to the period of these four pulses. The D Binary 16 output pulse opens a gate 20 and the Δ Binary 19 output pulse controls a second gate 21, which permits clock pulses from a a crystal controlled oscillator 22 to pass through for accumulation in three counters 23, 24, and 25. The D Binary 16 output pulse controls the number of clock pulses permitted to enter a 5 digit BCD counter 23 and simultaneously a 17 Bit Binary A counter 24. The Δ Binary 19 pulse controls clock pulse entry into a 16 Bit Binary B counter 25. Thus, for an ideally periodic signal, the A counter 24 will contain twice the accumulated clock pulses as the B counter 25 at the end of a sample interval. The pulse rate computing filter provides the following functions: (1.) To quantize the time interval of the D pulse via A counter 24 and the time interval of the Δ pulse via B counter 25; (2.) To determine the magnitude (A − 2B) which is the quantized equivalent of the time interval difference between the D pulse and twice the Δ Pulse; (3.) Compare the quantity (A − 2B) to the quantity KA where K is a precisely known multiplier of A derived from the typical ratios (1/32) = 0.031 (or 3.1%), (1/64) = 0.016, and (1/128) = 0.0078. (4.) To determine if the magnitude (A − 2B) is greater than, equal to or less than KA; (5.) To accept as valid Doppler period data the contents of the A counter 24 or the equivalent contents of the BCD counter 23 when the condition KA ≥ (A − 2B) occurs. This condition is exclusively true when the time interval difference between the D pulse and twice the Δ pulse is equal to or less than a preselected percentage of the D pulse time interval; (6.) To reject as invalid data, contents of counters 23 and 24 when KA < (A − 2B) and to reset all counter logic and permit a subsequent data sample to be made; (7.) To perform the above sequence (exclusive of the D pulse time interval) in less than 10 microseconds in order that a high data sample rate may be employed. The A through D Binary 15, 16 are comprised of ECL class JK flip-flop integrated circuits such as are made by Motorola of Phoenix, Arizona and have a manufacturer's designation of MC 1027. The R-S inhibit binary 18, is an ECL class integrated circuit which is available under part number MC1010 from Motorola, Phoenix, Arizona. The Δ binary 19 is the integrated circuit available under the part number MC1032 from Motorola, Phoenix, Arizona.

The digital pulse rate computing filter is implemented as follows. The trailing edge of the D Binary 16 output pulse triggers a delay 1-shot, 26, at the same time that gate 20 is closed to further clock pulses from time base 22. The delay 1-shot 26 (1 microsecond duration) provides a waiting time interval during which interval the contents of the A counter 24 and the 2's complement form of the B counter 25 are applied to the 17 bit full adder 27. The adder 27 utilizes a serial carry which in the worst case must propagate through all 17 bits of the adder and requires a finite waiting time for transient decay. The 2B function (i.e. the quantized equivalent of twice the Δ pulse time interval) is obtained by hard wiring the B counter 25 contents into the full adder 27 such that a one bit shift to the left is effected upon the B counter 25 binary number with respect to the A counter 24 Binary number. It may be seen that this effects a multiplication by two upon the B counter 25 binary number. This resultant number 2B is complemented by inverter 28 and applied to the adder 27 together with the A counter 24 binary number. The adder 27 sum bits provide the quantity (A − 2B) or the complement of this quantity dependent upon whether the A counter 24 binary number is greater than or less than twice the B counter 25 binary number. If A is greater than 2B the adder 27 outputs a positive number at the sum bits which is the magnitude (A − 2B) and outputs a carry out to the sign bit binary 29. The sign bit binary 29 drives the enable bus to the 2's complementing exclusive OR gates 30 low so that the number present at the adder 27 sum bits passes through gates 30 without inversion and appears as an input at the thirteen bit digital comparator 31. If A is less than 2B, then the adder 27 outputs the complement of (A − 2B) and no carry out appears at the sign bit binary 29. The enable bus remains high and the Adder 27 output is complemented by gates 30 and appears at the comparator 31 as the magnitude (A − 2B). Note that only magnitude notation (absolute value of A − 2B) is of interest at the comparator 31.

The remaining binary number input to the comparator 31 is the quantity KA. This number is obtained by a hard wired division of the binary number found in the A counter 24. Shifting the A counter 24 binary number to the right by five bits divides the number by 32; a right shift by six bits performs division by 64 and by seven bits divides by 128, etc. The A counter 24 binary number, bits six through 17, is wired to a four-input 12 bit digital multiplexer 32 so that selective division by 32 through 256 may be effected. Thus, the magnitude of the second binary number KA inputted to the digital comparator determines the data window time interval width. For a given Doppler burst type signal as the data window narrows the data acquisition rate drops but the data quality goes up.

The digital comparator 31 is inputted with the two sources of information, (A − 2B) (in magnitude form) and KA, may now make the decision KA ≥ (A − 2B) or KA < (A −2B). This decision is available at the comparator 31 output terminals when the digital comparator enable 1-shot 33 is triggered.

Sequencing the processor through a data sample requires certain steps be performed in an orderly time sequence. Once the A counter 24 and B counter 25 have acquired data, the delay 1-shot 26 is triggered as previously discussed. This permits adder 27 settling time. At the delay 1-shot time out the digital comparator enable 1-shot 33 is sequentially triggered permitting the comparator 31 output to be seen by either one of two control lines.

The control logic sequence when a signal appears on KA ≥ (A − 2B) line is as follows. If the output of the comparator 31 is KA ≥ (A − 2B) then a strobe pulse appears on strobe bus 34 to a 20 BCD bit data latch 35 which permits transfer of the BCD counter 23 contents to a decoder/visual digital display 36 and to an external data transfer terminal 37. The same strobe bus 34 enables a 17 bit binary data latch 38 for natural binary data transfer to terminal 39. Data latches comprised of type D binaries offer temporary storage of data originally contained in counters 23 and 24. The latches retain the data while the processor is permitted to continue a subsequent data sample cycle. This provides display by unit 36 when the processor operates in the slow sample rate mode for the asynchronous removel of data from terminals 37 and 39 by high speed external data acquisition systems 42 when the processor operates in the fast sample mode. Slow to medium speed (less than 100 Kilobits/sec) data acquisition systems 42 (DAS) require that the processor wait (i.e. data remain unchanged) while data transfer is made. This mode of operation exists through the print command 41 and printer hold-off 55 signal exchange. When the comparator 31 issues the initial signal on the KA ≥ (A −2B) bus, the leading edge of this signal causes unit 41 to issue a print command to an external DAS 42. The DAS 42 returns a hold-off signal to the recycle 1-shot 54. The recycle 1-shot 54 would normally trigger on the trailing edge of the signal from the comparator 31 as the enable 1-shot 33 times out. The hold-off signal causes the recycle 1-shot 54 to wait until data transfer is effected at which time the external DAS 42 removes the hold-off signal and the recycle 1-shot 54 triggers. The recycle 1-shot 54 operates in a manual select fast-slow sample rate mode and outputs a pulse thru NAND gate 53 onto a zero bus. The fast-slow sampling rate control 52 comprises a manual switch by which either of two RC timing circuits, one having a fast time constant, the other having a slow time constant, may be connected to the 1-shot multivibrator 54 such as the Fairchild 9601 available from Fairchild in Mountain View, California. This pulse resets all counters 23, 24, and 25, to zero count contents, and resets all sampling binaries 15, 16, and 19 as well as gate 17 to the required initial condition for a subsequent Doppler burst signal data sample. During the recycle 1-shot 54 time out, all binary logic in the processor is frozen. With the sample rate control 52 in the slow sample rate mode the processor recycle time is slowed to a selectable few samples per second which permits visual observation of the display 36. Control 52 in the fast sample mode permits the recycle 1-shot 54 to time out within 1 microsecond. Thus, a minimum but adequate time is permitted for counter and sampling binary reset. At the trailing edge of the recycle 1-shot 54 pulse the logic block 53 relinquishes control of the processor and control reverts to the oscilloscope 13 through the medium of gate 14. At the next Doppler burst, the scope 13 opens gate 14 and a new data sample begins.

During the counter control logic 53 sequence when the digital comparator enable 1-shot 33 is triggered and the comparator 31 is enabled a signal may appear on the KA $<$ (A $-2$B) line rather than the KA $\geq$ (A $-2$B) line. The recycle logic sequence now follows a different pattern than previously discussed. A print command 41 is not permitted to be issued to an attached DAS 42. The trailing edge of the signal from the comparator 31 triggers the error reset 1-shot 51 which through gate 53 reset all counters 23, 24 and 25 to zero and all sampling binaries 15, 16, and 19 to their required initial conditions. The 1-shot 51 simultaneously through gate 50 strobes the data latches 35 and 38 causing all zeros to enter the latches. The visual display 36 now displays all zeros to reflect that the data sample currently being processed has been rejected. At the error reset 1-shot 51 time out, the control of the processor is transferred as before to the oscilloscope 13 for a subsequent data sample.

The error reset 1-shot 51 may receive other inputs in lieu of the KA $<$ (A $-2$B) input. The 1-shot 51 once triggered in all cases prescribed the same sequence previously described. A manual reset switch 57 permits counter reset to zero at any time during processor operation. Inputs to the 1-shot 51 may be received from the P max/Pmin 58 detector. The detector 58 receives certain BCD data from counter 23 which is correlated with the specific frequency band currently selected from the analog filter 12. The detector defines the minimum and maximum acceptable D binary pulse interval for a signal passing through a specified bandpass filter 12 with defined frequency limits. D binary pulses outside these limits will not be accepted for processing. Detector 58 also serves as over-flow monitor for counters 23, 24, and 25. The Pmax/Pmin detector 58 is a time period detector which is comprised of DTL nandgates, such as MC862 or MC846 commercially availably from Motorola, Phoenix, Arizona.

The Data Processor as discussed above was assumed to be processing signal bursts containing 10 to 30 Doppler frequency sinusoids per burst. This type signal is created by scattering center passage through a LDV probe volume with stationary fringe lines. The limited duration of data and variations in data waveforms available for period averaging precludes data accuracy figures better than 0.1 to 0.2% of indicated value. A LDV employing a Bragg cell modulation of the laser beam provides a probe volume with fringe lines in motion at the frequency of the Bragg cell driving oscillator. Moderate velocity light scatter centers passing through this probe volume will produce a burst signal containing several hundred to a thousand signal sinusoids per burst. It is significant that the direction of passage of the scatter center through the probe volume may be determined with reference to the known modulation frequency. The accuracy of the signal period however must be determined to better than 0.01%. The pulse rate filter previously discussed may be applied to this signal area by extending the number of bits in the counters 23, 24 and 25 and sampling a nominal 500 in lieu of eight pulses of Doppler signal information. A comparable increase in bit capacity must also be made in the digital comparators, complementers, adders and multiplexers. The data window width may then be reduced to achieve the desired accuracy figure. Note that the KA term can be progressively reduced to small values by repetitive division of the A counter contents by 2.

Figure 2:
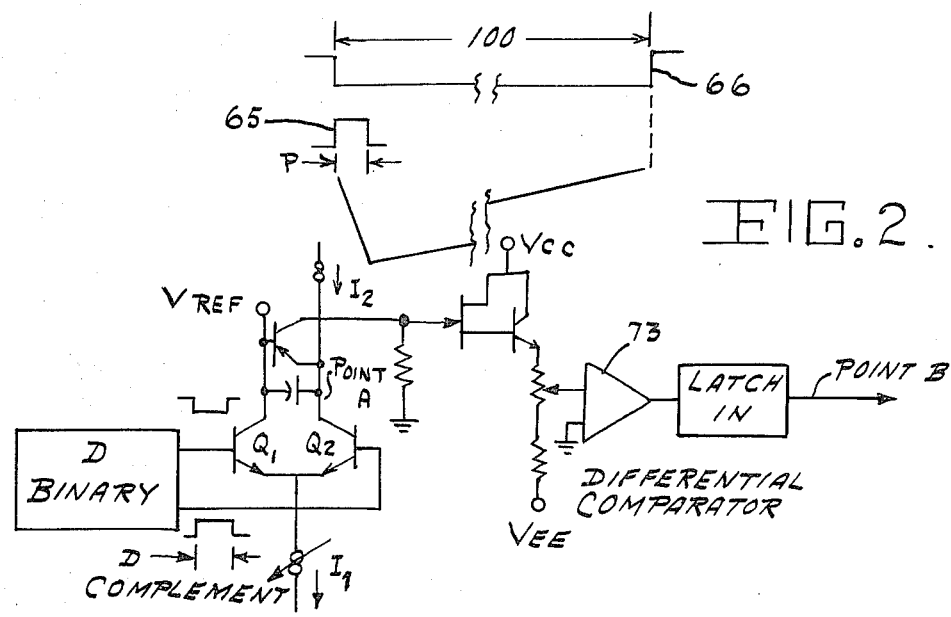
FIG. 2 is a schematic diagram of the pulse stretcher circuit.

The initial description of the processor indicated a useful frequency range up to 500 KHz. This figure arises from the available time base standard (clock frequency) available within the processor. As the D binary pulse time duration becomes shorter the number of clock pulses captured during the interval becomes smaller. A limit is reached where the desired time resolution is not available. Limits likewise exist for increasing the clock frequency and necessary switching logic speed required to follow the clock. It is practical however to increase the actual clock pulse gating time interval (extend the D binary pulse interval) by a factor of 100 through the use of pulse stretchers. This will permit the extension of the sampled frequency to 50 MHz. A further extension by a factor of 10 may be achieved by either an increase of X10 the clock frequency or use of an ultra stable X1000 pulse stretcher. A typical pulse stretcher as employed in the DDP is shown in FIG. 2. The pulse stretcher of FIG. 2 may be incorporated into FIG. 1 at points 63 and 64 where true and complement forms of D pulse and $\Delta$ pulse are applied to $Q_1$ and $Q_2$ FIG. 2. The $Q_1Q_2$ pair serve as high speed current switches to direct constant current source $1_1$ into capacitor C during the D pulse or $\Delta$ pulse interval. At pulse termination, $1_1$ is diverted into current sink, $V_{REF}$, and constant current source $1_2$ extracts the acquired charge in C at a much reduced rate. A resultant V-shaped waveform appears at point A FIG. 2. This waveform is converted into the waveform 66 seen at point B by the differential comparator 73 and latch 74. The time stretch ratio of pulse 66 to pulse 65 is controlled by the current source ratio $1_1$ to $1_2$. The stretched pulse 66 now becomes the gating pulse applied to gates 20 or 21 of FIG. 1.

In applications where maximum data sample rates are desired (turbulent velocity measurements), the time expended in the pulse stretcher stretch interval may become objectionably long. An alternate technique for increased counter resolution at higher frequencies without the use of pulse stretchers is described with reference to FIG. 3. The current switches $Q_1$ and $Q_2$ are used to divert current source $1_1$ away from capacitance $C_1$, at which time $1_2$ alone passes through $C_1$ producing a voltage ramp at point 100 which at any instant in time can be described by $$e-e_o = \frac{I_2(t-t_o)}{C_1},$$

assuming $I_2$ and C remain constant values. This constitutes a time interval to pulse height converter. At the trailing edge of the input D pulse or $\Delta$ pulse, it is desired to read the peak value of $e-e_o$ attained in the D or $\Delta$ pulse time interval. Several conventional techniques are used: (A) A peak reading detector such as a high speed integrator may be used to store the peak value of $e$ reached. (B) A high speed sample and hold gate 80 may be strobed at the trailing edge of the D or $\Delta$ pulse. (C) Current source $1_2$ may be gated off as shown with the stored change in $C_1$ locked in while a high speed analog to digital converter 81 is strobed to convert the analog voltage $e$, equivalent to the D or $\Delta$ time interval, into a digital output. Typical A to D converters would provide 8 or 10 Binary Bit outputs in 4 to 20 microsecond conversion time. The state of the art 8 bit converters can convert in 600 nanoseconds. This would provide 1 part in 256 and 1 part in 1024 resolution for the 8 and 10 bit converters respectively. The Binary equivalent of the D and $\Delta$ pulses may now be inputted dierectly into the adder 82, as the counterpart of the A and B counters 24, 25 contents described in FIG. 1. The same remaining procedure now applies to FIG. 3 as was discussed with FIG. 1 for determining the values $KA \geq (A-2B)$ or $KA < (A-2B)$. The data that passes the $KA \geq (A-2B)$ test may now be transferred from the A/D converter 81 out to a bulk data storage system. An 8 or 10 bit binary to BCD converter 83 is employed for code conversion to BCD for use with a visual decimal display 84 or digital line printer 85. It may also be noted that analog computing and/or storage techniques may be practiced directly upon the voltage value $e$ while the A/D conversion takes place.

High speed sampling involves the prerequisite that a high speed data transfer rate capability exists. The inclusion of a small computer 86 with direct memory access, DMA 87 into the system of FIG. 3, offers a practical means for increasing the transfer rate of digital data. Mini-computers with DMA capability are commonly available with 4K to 32K word by 12 to 16 bit memory capacity. Computer memory recycle time (time required to write/read a full 12 or 16 bit word into memory) typically will require less than 2 microseconds. The mini-computer 86 is any of the well known devices by this name, such as the Hewlett Packard 2100, available from Hewlett Packard, Palo Alto, California. The MOS/LST calculator 116 is a standard integrated circuit calculator such as the type known as Standard Calculator circuit sets which is commercially available from Electron Arrays, Mountain View, Calif.

Figure 3:
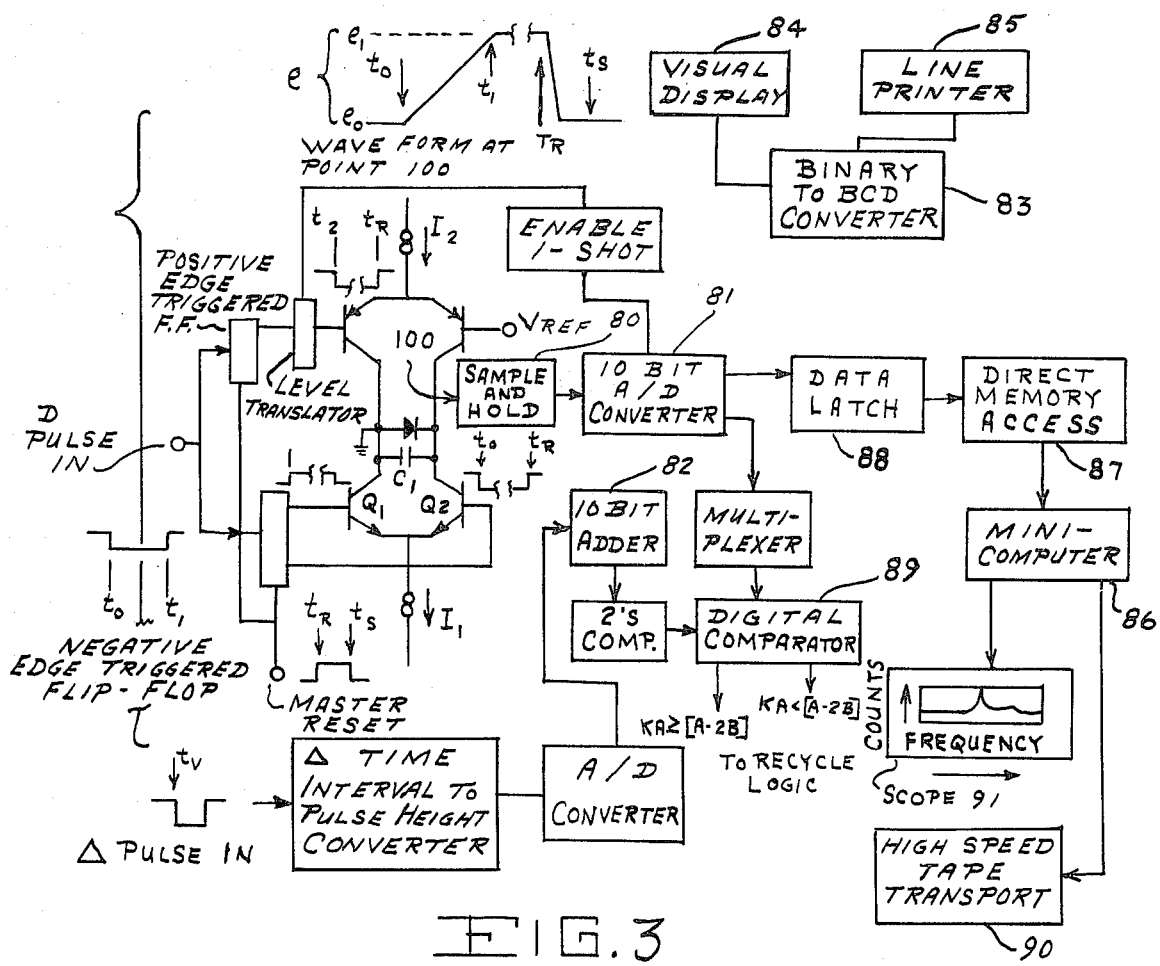
FIG. 3 is a block diagram, partially in schematic form, of an alternate embodiment of the Doppler data processor apparatus without the use of pulse stretchers.

The system as shown in FIG. 3, can be viewed as three interrelated functioning parts. The sampling binaries and pulse height converters are permitted to cycle at their maximum possible rate contingent only upon a high Doppler burst input rate. Pulse height data $e$ obtained at the end of a sample interval is transferred to a sample and hold gate 80, typical transfer time 100 nanoseconds. The sampling binaries are immediately reset preparatory to sampling a subsequent Doppler burst signal. A start conversion signal is applied to the A/D converter clock when sampling binary reset occurs. The converter 81 with a nominal 15 microsecond conversion time issues an end of conversion signal when the A to D conversion is completed. The binary output of the A/D converter 81 is then transferred to latch 88 and the A/D converter 81 is free to begin a new conversion cycle when the sampling binaries produce further pulse height data. Data now contained in latch 88 may be processed through adder 82 to digital comparator 89. If $KA \geq (A-2B)$, then the comparator 89 will enable the DMA 87 to transfer data from latch 88 to computer memory 86. The combined cycle time of solving $KA \geq$ or $<(A-2B)$ and the transfer time to computer 86 is designed to be always less than the A/D converter 81 conversion time.

Assuming a high density of burst data is presented to the sampling binaries, it is possible for a sampling interval to be in progress at the same time that A/D conversion is being performed upon the previous sample and a prior sample yet is being processed through the pulse rate filter for possible transfer to computer memory 86. A conservative sample rate of 20,000 samples per second can thus be achieved. A computer with 32K word memory would require only a few seconds for memory saturation at this rate. Not all data samples result in valid data transfer, yet not all of the computer memory can be relegated to data storage. The computer 86 can, however, act as a buffer memory and batch transfer the stored data to an attached high speed magnetic tape transport 90 at a faster rate than the input data acquisition rate.

Buffer memories which are a self contained package designed specifically for parallel data entry at a random rate with the capability of outputting the received data in a block form, exist as standard commercial items. The buffer can output data on a first-in first-out basis at word rates through 2 MHz. Memory capacity can exceed 1000 words with dual buffer options where one buffer receives data while data in the second buffer are being transferred to tape or magnetic disc storage.

An alternate data acquisition mode more conservative of memory capacity would view the binary word contained in the latch 88 as a memory address only. The 10 bit A/D converter 81 can output a nominal one thousand possible addresses. Each time a specific address is applied to the computer memory 86, the word location for that specific address is incremented by one count. A 16 bit word location (15 bits for data) could then contain in excess of 32,000 incremental counts or times that the specific word location has been addressed before overflow ($2^{15} = 32,768$). Since the acquired data, at best, would possess a spread, or occupy several locations in memory, the potential capacity would be larger. Further, it is noted that only 1K of the 32K word memory is active in the data acquisition at a given time. The computer can periodically switch to an alternate 1K word memory plane where data acquisition continues. The computer 86 can now resolve the rms values of velocity stored in the first plane and transfer this much compressed information to an attached line printer for immediate observation. Alternately, the computer 86 can output the contents of the 1K word memory plane to a D/A equipped oscilloscope 91 to display a Doppler frequency or velocity spectrum-number of counts per memory word or channel displayed versus the number of channels.

Figure 4:
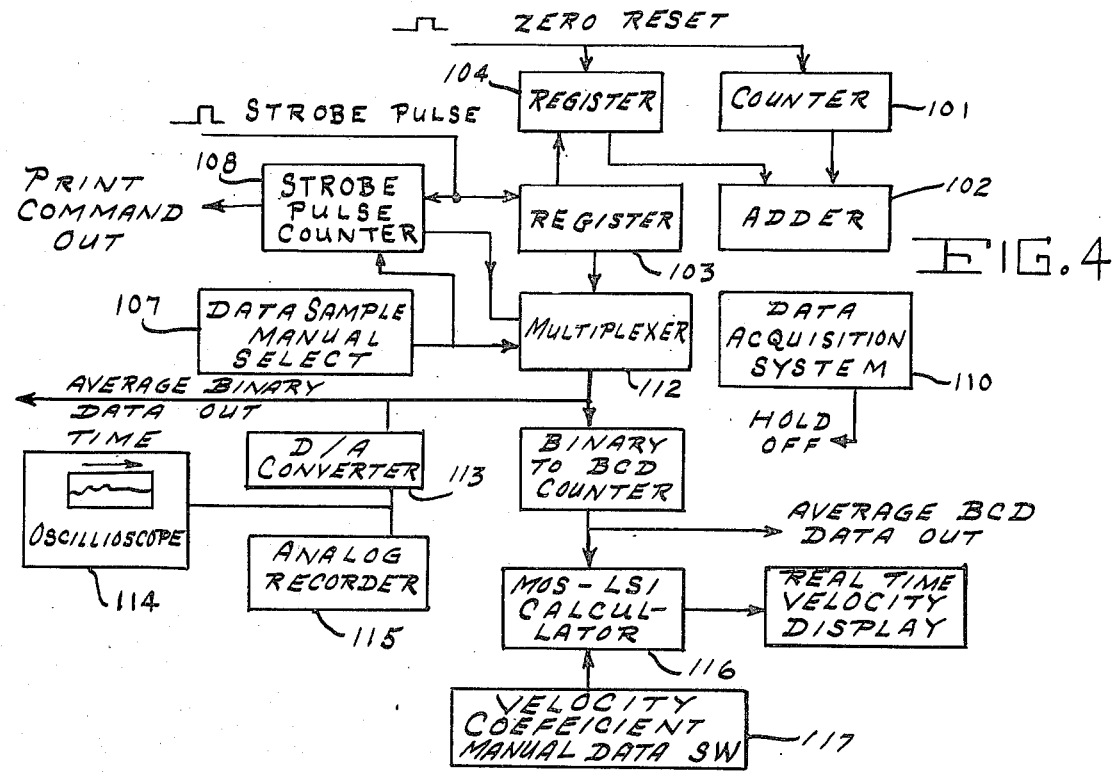
FIG. 4 is a block diagram of the data averaging integral which may be utilized in an alternative embodiment of the Doppler data processor.

In areas where a limiting transfer rate to an attached data acquisition system, places objectionable constraints on the data sampling rate or "on line" average of sampled data is desired, the method shown in FIG. 4 may be used to advantage. Each acceptable signal KA $\geq (A - B)$ contained in the 17 bit A counter, or an alternate A/D converter 101, is applied to adder 102 together with any number contained in register 104. The resultant sum (all input numbers positive) appears at input to Register 103. The quad latch strobe pulse is subsequently applied by counter recycle logic to enable register 103 to store information present at its input (i.e., A counter 101 plus register 109 contents). Following the strobe pulse, the zero reset pulse that resets the A counter 101 to zero, is applied to register 104 to transfer Register 103 output into register 104. A subsequent data sample is made and again transferred from the A counter 101 thru the adder 102 into Register 103 when strobe pulse is applied. Sequentially, Register 103 transfers into Register 104 when Zero reset pulse occurs. It is now noted that Register 104 holds the sum of two data samples taken from the A counter 101. This sequence of events will continue for a preselected number of times as controlled by manual selector 107. The number of samples averaged must however be in units of 2-4-816, etc. Each time a sample is stored a strobe pulse counter 108 will increment by 1 count until the number of samples pre-selected by the manual select SW 107 has been reached. Counter 108 equipped with "AND" comparator logic, compares the binary number inputed by switch 107 to its own accumulated count and resets to zero when coincidence occurs. A print command is issued to an attached data acquisition system 110 when counter 108 resets to zero. The DAS 110 may now return a hold-off signal to interrupt data sampling until the stored data have been removed. Counter 108 will enable the multiplexer selector switch 112 when counter 108 reset to zero occurs.

Register 103 contains the sum of a preselected number of data samples. The arithmetic average of these samples is obtained by dividing the sum by the number of samples. The multiplexer switch 112 is programmed by the manual select switch 107 to pass the register 103 contents divided by the proper power of two. Recall that division by 2, 4, 8, etc. is effected upon a binary word by shifting the word 1, 2, 3, times to the right. The averaged binary data may usefully be converted to a proportional voltage by a D/A converter 13. This "analog" voltage can be applied to the y-axis of an oscilloscope 14 and the time variant curve of Doppler period (proportional to voltage magnitude) displayed. A time scaled strip chart recorder 15 may also be employed for a continuous and permanent record.

Raw data, as seen to be produced by the Doppler Data Processor, is in the form of the period $$\left(\frac{1}{f}\right)$$

of the Doppler shift frequency. Flow media scatter center velocity is related to the Doppler period by $$V_1 = \frac{\lambda_o}{(\text{Period}) \, 2n \sin \frac{(\theta)}{2}}$$

where $V_1$ is the velocity perpendicular to the LDV probe volume fringe line plane; $\lambda_o$ is the wavelength of the laser emitted radiation; $n$ is the index of refraction of the flow media; $\theta$ is the included angle between the crossed laser beams. For a given installation with laminar flow $V_1$ may be found by dividing the Doppler period into a constant.

"On line" monitoring of flow media velocity can be implemented by digital or analog techniques.

Large scale integrated circuits 16 (MOS - LSI) commonly used in desk top calculators provide a digital means for conversion of raw Doppler period to velocity units. A manually encoded constant is provided by thumb wheel switches 17.

The most significant error mechanism in the Doppler frequency burst data capture process lies in the difficulty if establishing an accurate zero crossing for waveforms that vary over a wide latitude. Variations in excess of twenty to one can be expected of the Doppler frequency peak to peak amplitudes as well as the pedestal height. Waveform symmetry can be despoiled by superimposed noise and LDV optical misalignment. The pulse rate filter data window can be made progressively more narrow thus increasing the selectivity of data capture at the expense of decreasing the data capture rate. The capture rate can be compensatingly increased by increasing the useful burst signal density-number of bursts per unit time. Contributions in this direction can be made by artificial seeding of flow, careful optical alignment, increased LDV probe volume fringe line radiant intensity and signal to noise ratio enhancement by analog filtering. Capture rate can also be increased at the expense of optical design considerations by extending the number of fringe lines in the probe volume, and producing signal bursts with a greater number of sinusoids per burst. The processor analog filter zero crossing detector may now produce improved accuracy period averaging data inputted to the sampling binaries and thus reduce the number of data samples rejected.

Figure 5:
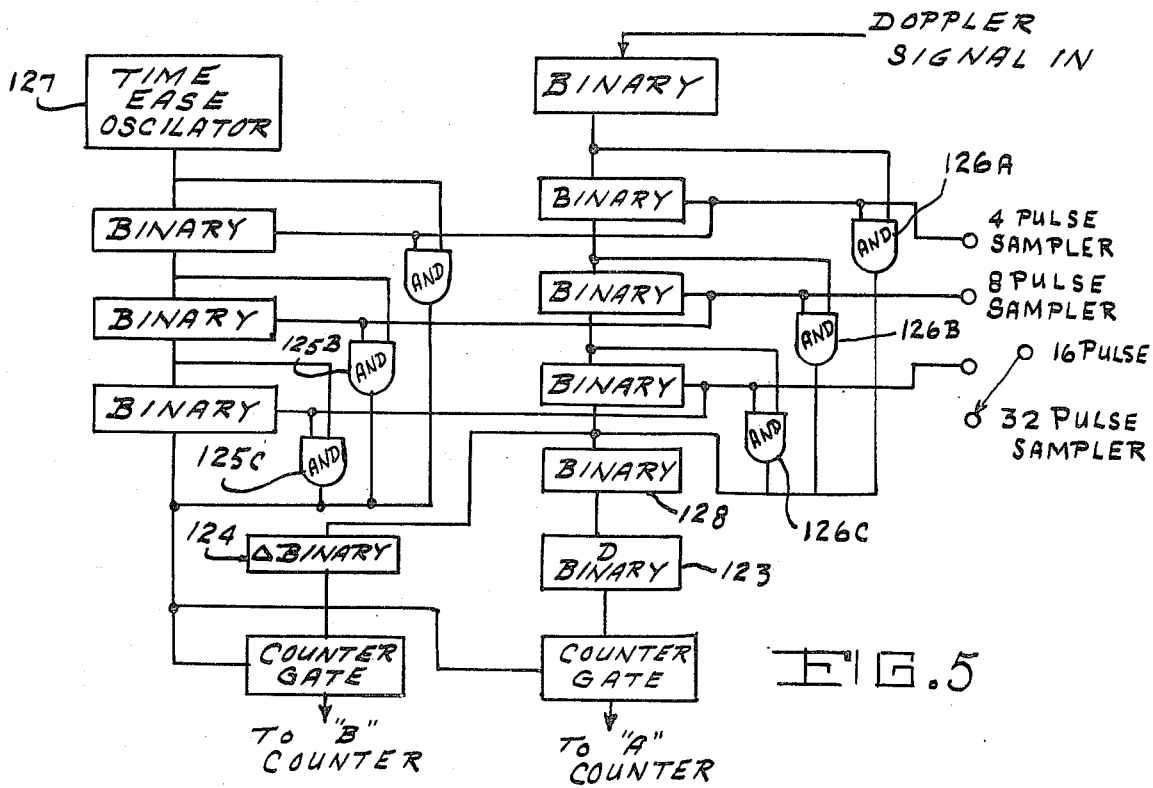
FIG. 5 is a block diagram of the Doppler data processor having the capability of sampling an extended duration frequency burst signal.

In those installations where the extended duration frequency burst signal can be generated, with acceptable trade-off, the Doppler Data Processor can be made to sample the extended information. Reference is made to FIG. 5 illustrating a selectable means for extending the sampling interval of the D Binary 123 from 4 to 32 pulses of Doppler information. The Δ binary 124 continues to receive one-half the input pulse data delivered to the D binary. AND gates 125-C and 126 A-C are used to jump (by pass) one or more binaries in the sampling chain. Jumped binaries are inhibited that is they may not toggle. The time base unit 127 as shown, is scaled to produce a constant ratio of clock pulses to time interval sampled.

Two useful variations of the circuit in FIG. 5 exist. Decade dividers or multibit binary counters may be substituted for binary (divide by 2) units in the fore part of the sampling chain. Thus pulse trains of many hundreds of pulses may be sampled as would be required for the Bragg Call LDV. All that is required is that one binary 128 exist between the Δ binary 124 signal pick-off point and the D binary 103 pick-off. A second variation would delete the time base scaling, that is, retain the higher time base clock rate for the longer sample intervals to increase the time interval resolution — useful at higher Doppler frequencies.

Frequency burst signals characterized by 10 in FIG. 1, are created by a single flow stream borne particle reflecting incident radiation during its passage across the LDV probe volume fringe line planes. Particle passage normal to the fringe planes requires only a single velocity component system for velocity vector magnitude resolution. As the particle trajectory departs from the fringe plane normal a two component system is required to describe particle passage in a given flow plane. A two component system consisting of two one component systems with two sets of fringe planes spacially superimposed and located orthogonal to one another is possible. The passage of each scatter particle through the interference fringes simultaneously produces two frequency burst type photo-detected signals, the frequencies of which are proportional to the two perpendicular components of particle velocity.

The Doppler Data Processor sampling technique is uniquely suited to the time correlation of signal burst data sets. Dual gates 17 FIG. 1 triggered by common oscilloscope 13 serve to direct the simultaneous occurring frequency burst signals to dual sampling binary data channels (a single channel is typically shown by 15, 16 FIG. 1). Source identification code numbers can be assigned to the dual data print-out for convenient data classification. Data capture for a three velocity component system would employ three sampling data channels slave controlled by a single oscilloscope gating pulse. Data print-out may be made if any channel processes valid data or print-out withheld until all channels process valid data during a given sample interval.

Time interval between captured frequency bursts is desirable input data when sampling turbulent flows. A continuous running lapsed time or time totalizing counter equipped with latches, offers a means of producing this information. The counter latches are strobed to store the time record each time the oscilloscope 13 FIG. 1 opens gate 17 and a data sample is made. If the data sample is accepted as valid data the processor will issue a print command to an attached DAS 42. The DAS 42 can be programmed to accept the stored time record data together with the Doppler period data. If the sample interval failed to produce valid data then the time record data is not transferred but is updated at the next gate 17 opening. This offers a simple reliable means of time record keeping but requires a counter with extended bit capacity when the total test run time is long or the time resolution requirements extend into the microsecond region.

Time interval counting with sub-microsecond time resolution can be implemented with an auxiliary counter (comparable to the BCD Counter 23 or Binary Counter 24, FIG. 1) employed for measuring the time intervals between D pulses. An adder-accumulator is used to sum the D pulse time interval (quantized by counter 23 and 24) and the interval between D pulses (quantized by the auxiliary counter). The object is to partition the running time record into intervals between only those frequency bursts accepted as data. All frequency bursts sampled do not result in recorded data and the decision of how to partition the time intervals is made by the digital comparator 31 during the processor recycle sequence. The adder-accumulator is directed by comparator 31 when to transfer past time data and start a new time interval partition. The auxiliary counter and the D pulse interval counter are noted to alternately be actively counting; one counter starts at the instant the other counter stops. The off time of each counter provides the opportunity for data transfer to storage and counter zero reset to minimize an accumulating error over a long time interval. The auxiliary counter may use the same time base used by the D pulse interval counter and requires a maximum bit capacity based only upon the maximum time interval to be expected between sampled frequency bursts, regardless of whether each burst is recorded as data.

Although the invention has been described with reference to a particular embodiment, it will be understood to those skilled in the art that the invention is capable of a variety of alternative embodiments within the spirit and scope of the appended claims.

We claim:

1. A doppler data processor apparatus for processing frequency burst type data produced to a laser doppler velocimeter comprising in combination:

an analog filter unit to receive an output doppler data burst, said analog filter unit filtering said input doppler data burst to attenuate extraneous noise, said analog filter unit providing doppler burst data in response to said input doppler data burst, a sampling unit connected to said analog filter unit to receive said doppler burst data, said sampling unit providing a D pulse and a Δ pulse signal of four and eight doppler time periods respectively, a time base unit to provide clock pulses, and a digital pulse rate computing filter connected to said sampling unit to quantize the time interval of said D and Δ pulse signals, said digital pulse rate computing filter receiving said clock pulses to provide a time base, said digital pulse rate computing filter utilizing said time base and said time interval of said D and Δ pulse signals to establish predetermined doppler period limits, said digital pulse rate computing filter comparing the time interval difference between the D and Δ pulse signals with said predetermined doppler period limits, said digital pulse rate computing filter accepting valid doppler period data.

2. A doppler data processor as described in claim 1 wherein said digital pulse rate computing filter computing filter comprises in combination:

an A counter to receive and store said D pulse signal, said A counter having an output signal A, a B counter to receive and store said Δ pulse signal, and B counter having an output signal B, an adder unit receiving said output signals A and B, said adder unit processing said output signals A and B to provide a predetermined limit, said predetermined limit being the quantity (A−2B).

a digital comparator to compare said doppler burst data with said quantity (A−2B), said digital comparator determining whether said doppler burst data is equal to, less than or greater than said predetermined limit, said digital comparator providing a control output signal, and a logic unit connected to said digital comparator to receive said control output signal, said control output signal being a recycle signal when said doppler burst data is equal to or less than said predetermined limit, said control output signal being an error reset signal when said doppler burst data is greater than said predetermined limit.

* * * * *